United States Patent
Mantri

(10) Patent No.: US 10,832,485 B1
(45) Date of Patent: Nov. 10, 2020

(54) CAPTCHA AUTHENTICATION VIA AUGMENTED REALITY

(71) Applicant: Verizon Patent and Licensing Inc., Arlington, VA (US)

(72) Inventor: Viraj C. Mantri, Hyderabad (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/449,791

(22) Filed: Jun. 24, 2019

(51) Int. Cl.
| | |
|---|---|
| *G06T 19/00* | (2011.01) |
| *G06T 7/70* | (2017.01) |
| *G06F 3/01* | (2006.01) |
| *G06F 21/31* | (2013.01) |

(52) U.S. Cl.
CPC ............ *G06T 19/006* (2013.01); *G06F 3/011* (2013.01); *G06F 3/017* (2013.01); *G06F 21/31* (2013.01); *G06T 7/70* (2017.01); *G06F 2221/2133* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,621,396 B1 * | 12/2013 | Gossweiler, III | ..... | G06F 3/0488 713/183 |
| 9,202,105 B1 * | 12/2015 | Wang | ...................... | G06F 21/32 |
| 10,311,223 B2 * | 6/2019 | Adams | ................... | G06F 21/36 |
| 10,429,923 B1 * | 10/2019 | Johnston | ................. | G06F 3/017 |
| 2009/0113294 A1 * | 4/2009 | Sanghavi | .............. | G06F 40/103 715/269 |
| 2009/0245593 A1 * | 10/2009 | Suzuki | ................. | G06K 9/6211 382/115 |
| 2009/0249476 A1 * | 10/2009 | Seacat | ..................... | G06F 21/31 726/17 |
| 2013/0015946 A1 * | 1/2013 | Lau | ......................... | G06F 21/32 340/5.2 |
| 2013/0063487 A1 * | 3/2013 | Spiegel | ................... | G06T 11/00 345/633 |
| 2014/0267254 A1 * | 9/2014 | Sievert | ..................... | G06T 17/05 345/420 |
| 2016/0188861 A1 * | 6/2016 | Todeschini | .............. | G06F 21/32 726/7 |
| 2016/0232401 A1 * | 8/2016 | Hoyos | ................ | G06K 9/00107 |
| 2016/0267340 A1 * | 9/2016 | Jensen | ............... | G06K 9/00885 |
| 2017/0094244 A1 * | 3/2017 | Karasudani | ........... | G06T 19/006 |
| 2017/0180348 A1 * | 6/2017 | Piccolotto | .......... | G06K 9/00906 |
| 2018/0060683 A1 * | 3/2018 | Kontsevich | ........ | H04N 5/23229 |

(Continued)

*Primary Examiner* — Motilewa Good Johnson

(57) ABSTRACT

A computer device may include a memory storing instructions and processor configured to execute the instructions to provide a presentation image to a user device, wherein the presentation image is associated with a first model. The processor may be further configured to receive an image captured by a camera of the user device and a recorded alignment of the presentation image on a display of the user device; generate a second model based on the received image captured by the camera of the user device; determine an alignment of the first model with the second model based on the recorded alignment of the presentation image on the display of the user device; and generate an authentication determination verifying whether a user of the user device is human, based on the determined alignment of the first model with the second model.

20 Claims, 13 Drawing Sheets

(56) References Cited

U.S. PATENT DOCUMENTS

| | | | | |
|---|---|---|---|---|
| 2018/0181737 A1* | 6/2018 | Tussy | ................. | G06K 9/00597 |
| 2018/0341779 A1* | 11/2018 | Sawant | ................. | H04N 21/00 |
| 2019/0303555 A1* | 10/2019 | Agarwal | ............... | G06T 3/0093 |
| 2020/0013222 A1* | 1/2020 | Fergie | ....................... | G06T 7/13 |
| 2020/0026842 A1* | 1/2020 | Jain | ......................... | G06F 21/36 |

* cited by examiner

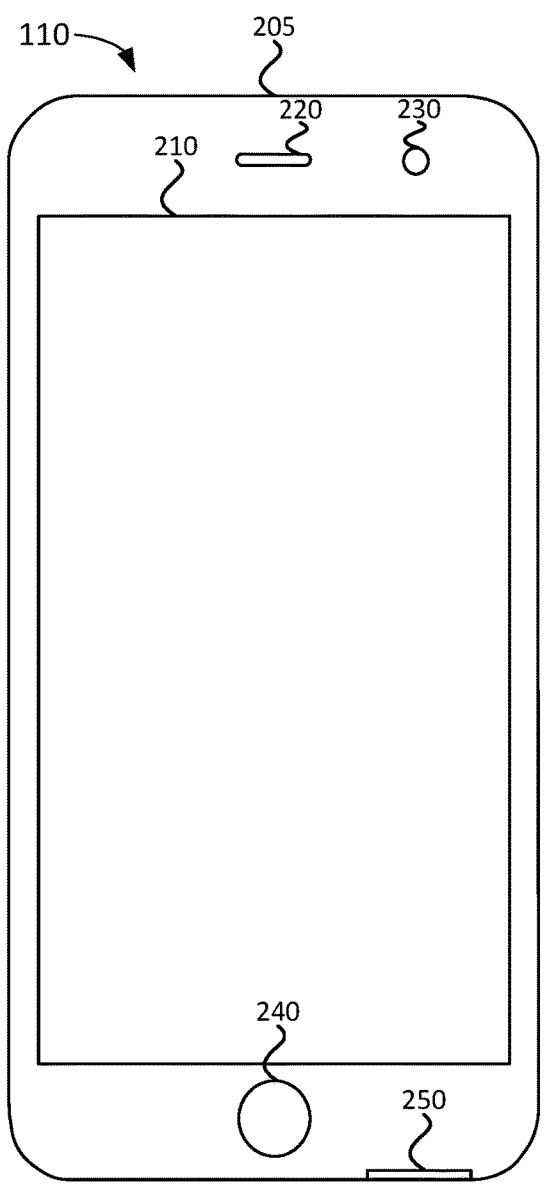 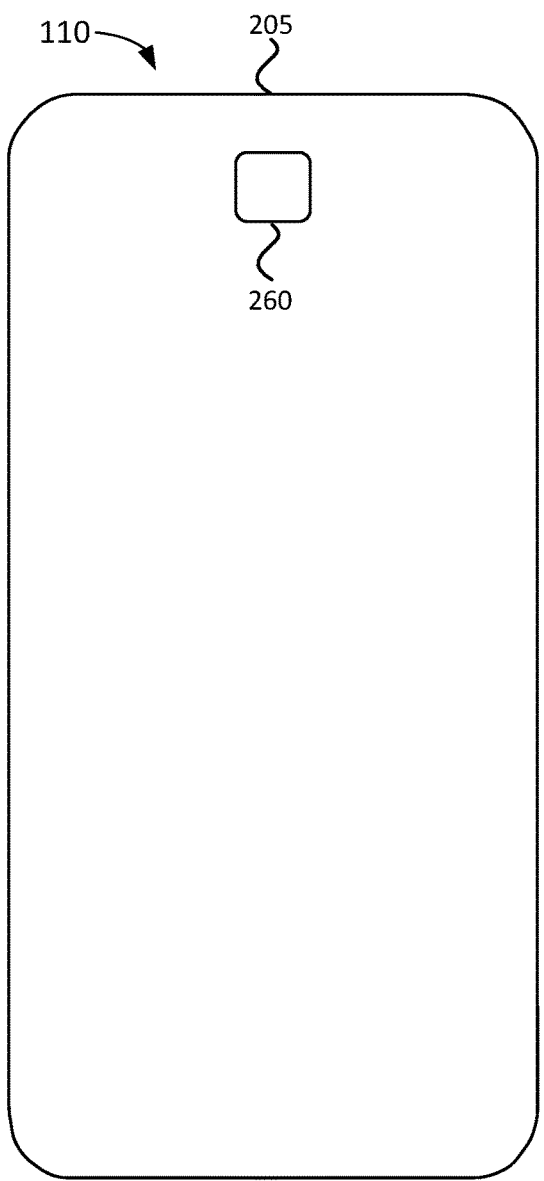
FIG. 2A  FIG. 2B

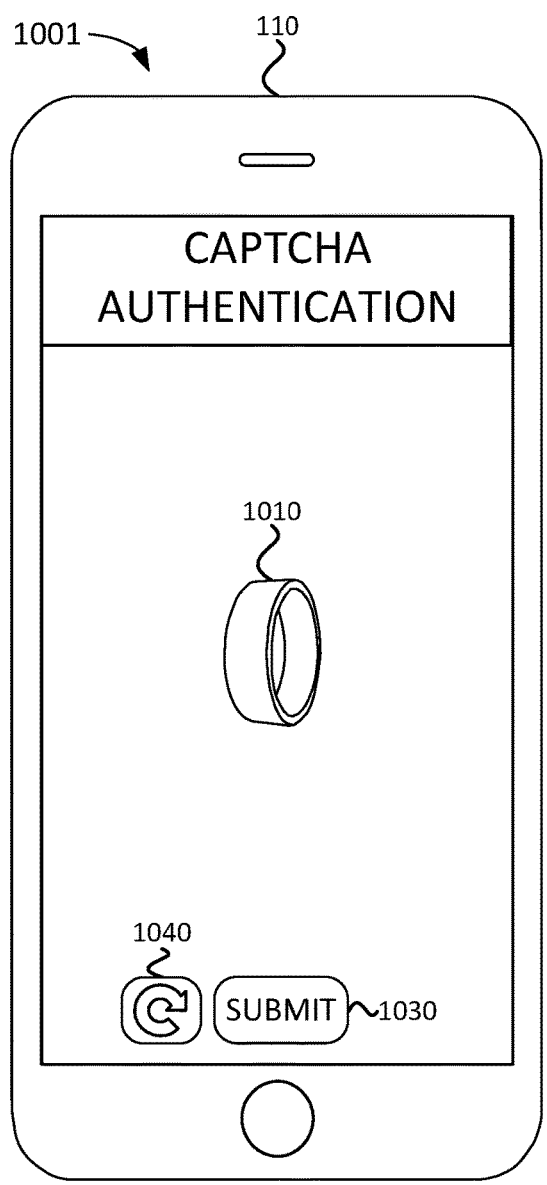
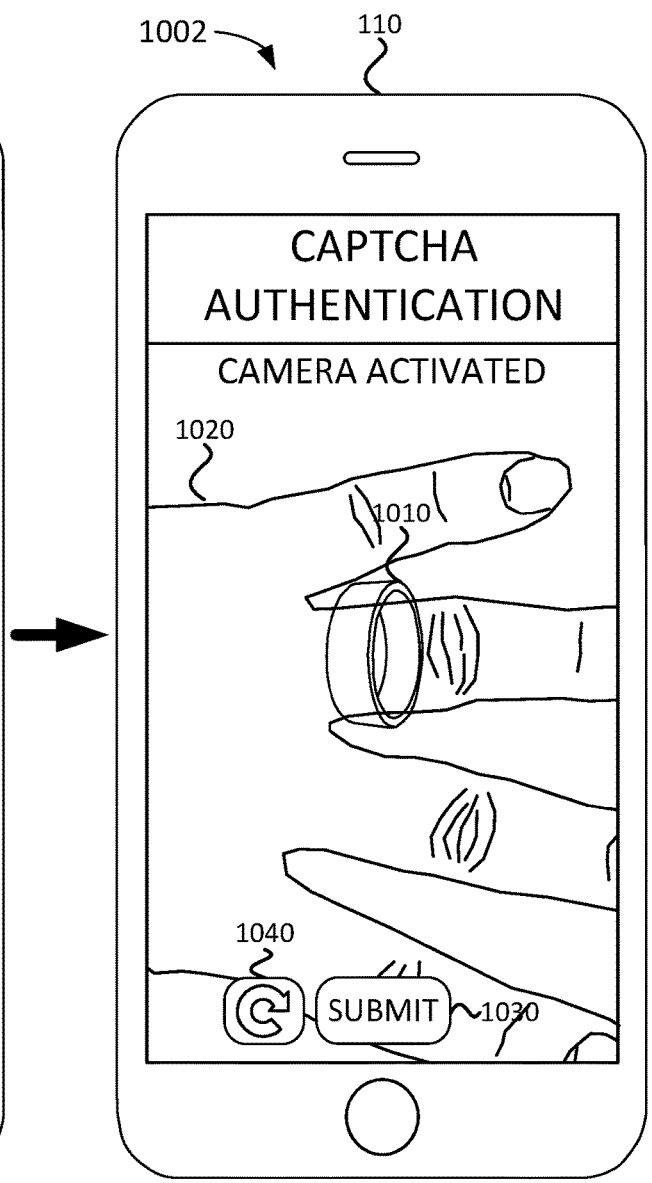
FIG. 10A  FIG. 10B

US 10,832,485 B1

CAPTCHA AUTHENTICATION VIA AUGMENTED REALITY

BACKGROUND INFORMATION

In order to satisfy the needs and demands of users of mobile communication devices, providers of wireless communication services continue to improve and expand available services as well as networks used to deliver such services. One aspect of such improvements includes the development of authentication procedures for different applications or situations. Managing authentication procedures for different types of devices in different situations poses various challenges.

BRIEF DESCRIPTION OF THE DRAWINGS

FIGS. 2A and 2B are diagrams illustrating exemplary components of the user device of FIG. 1 according to implementations described herein;

FIGS. 10A-10B are diagrams of a second set of exemplary user interfaces according to an implementation described herein;

DETAILED DESCRIPTION OF PREFERRED EMBODIMENTS

Figure 1:
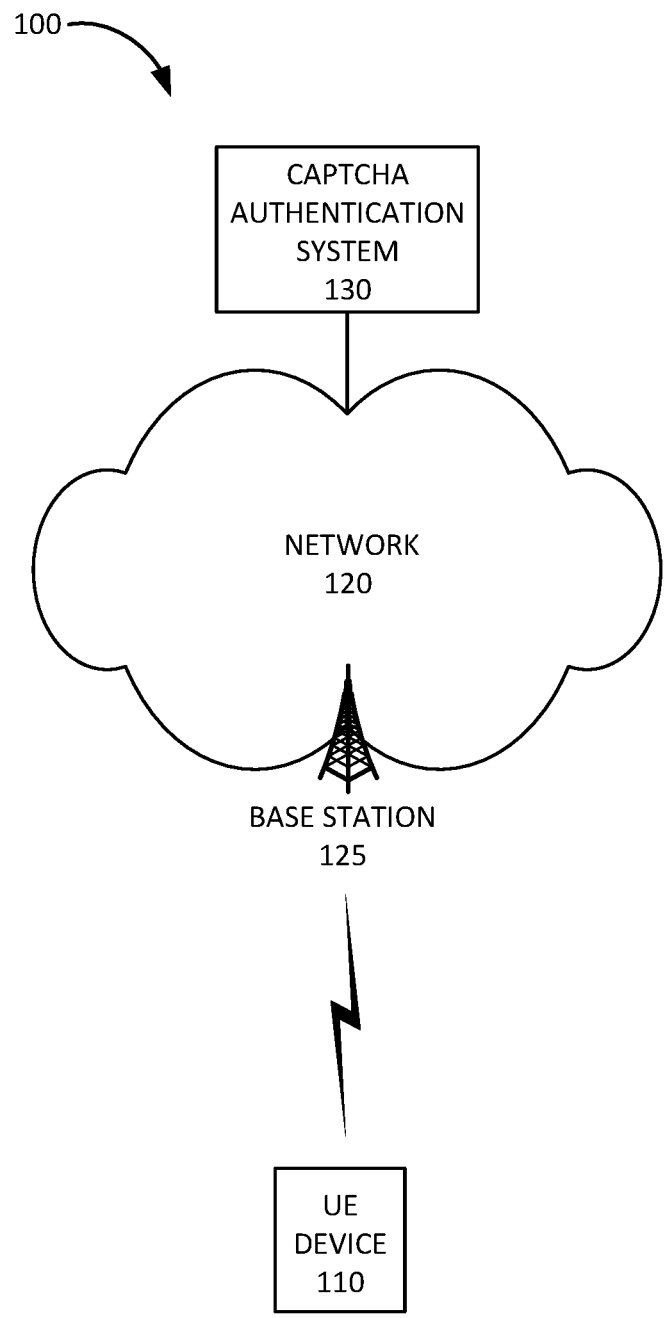
FIG. 1 is a diagram illustrating an environment according to an implementation described herein.

The following detailed description refers to the accompanying drawings. The same reference numbers in different drawings identify the same or similar elements.

An application or another type of service provided by a computer device may need to authenticate a user equipment (UE) device requesting to use the application or service. A type of authentication that may be used is a verification that a user of the UE device is a human and not a computer (also sometimes referred to as a "bot"), in order to prevent unauthorized use by a malicious computer system, such as a "botnet." A type of challenge-response test used by authentication systems to tell computer and human users apart is a "completely automated public Turing test to tell computers and humans apart," referred to by the acronym CAPTCHA.

In a CAPTCHA test, a user is presented with one or more images, which are difficult for a computer to interpret. The user is asked to enter input based on the presented one or more images, such as to type in text corresponding to distorted text presented in an image, to identify all images from a set of images that include a particular object, etc. Such CAPTCHA methods may pose various challenges. As an example, distorted text or objects in images may be difficult to interpret for some users. As another example, having to use a keypad or keyboard to enter text may be cumbersome for users.

Implementations described herein relate to CAPTCHA authentication via pairing of real and virtual objects using augmented reality images. During a CAPTCHA challenge, an image representing a virtual object may be presented to the user by an authentication system and the user may be asked to relate the virtual object in the presented image to a real object in the user's surroundings using a camera on the user's device. The user may be presented with an augmented reality image that overlays the virtual object onto an image of the user's surroundings obtained by the camera. In order to complete the CAPTCHA challenge, the user may need to pair the virtual object with a real object in the augmented reality image by aligning the virtual object with the real object in the augmented reality image.

As an example, the user may be presented with an image of a wristwatch and the user may need to align the wristwatch with an image of the user's wrist as viewed through the camera device, by dragging the image of the wristwatch to the image of the wrist or by moving the user device so that the image of the wrist is aligned with the image of the wristwatch. As another example, the user may be presented with an image of a ring and the user may need to align the ring with an image of the user's finger.

The user device may capture a three-dimensional (3D) image using a depth camera when the user is satisfied with the alignment. The captured 3D image may be sent to the authentication system along with alignment information of the virtual object in the presented image. Thus, a computer device configured to function as part of a CAPTCHA authentication system, may provide a presentation image to a user device. The presentation image may correspond to the virtual object to be presented to the user and be associated with a first model. The computer device may then receive, from the user device, an image captured by a camera of the user device and a recorded alignment of the presentation image on a display of the user device when the image was captured by the camera.

The computer device may generate a second model based on the received image captured by the camera of the user device, determine an alignment of the first model with the second model based on the recorded alignment of the presentation image on the display of the user device, and generate an authentication determination verifying whether a user of the user device is human, based on the determined alignment of the first model with the second model. For example, the computer device may determine that the alignment of the first model with the second model is within a particular range and generate an authentication determination that the user of the user device is human, in response to determining that the alignment of the first model with the second model is within the particular range.

In some implementations, the authentication determination may be sent to the user device. For example, the authentication determination may be sent to an application, running on the user device, which requested CAPTCHA authentication. In other implementations, the authentication determination may be sent to another device, such as a computer device hosting a web page requested by the user device or managing an application being used by the user device.

In some implementations, the image captured by the camera of the user device may include depth information and the generating of the second model based on the received image captured by the camera of the user device may include generating a 3D model using the depth information. The first model may also correspond to a 3D model and determining the alignment of the first model with the second model may include selecting a first set of points from the first model, selecting a second set of points from the second model, and determining whether particular ones of the first set of points are within a particular distance from particular ones of the second set of points. Additionally, or alternatively, determining the alignment of the first model with the second model may include performing object recognition on the generated second model and determining whether the image captured by the camera of the user device includes a particular object based on the performed object recognition.

In some implementations, the first model may represent an object wearable by the user and the second model may represent to a body part used to wear the object. In other implementations the first model may represent a first object and the second model may represent a second object couplable to the first object. In yet other implementations, the first model may represent an object and the second model may represent an environment associated with the object. In yet other implementations, the first model and the second model may represent objects with a different type of relationship.

FIG. 1 is a diagram of an exemplary environment 100 in which the systems and/or methods, described herein, may be implemented. As shown in FIG. 1, environment 100 may include a user equipment (UE) device 110, a network 120, and a CAPTCHA authentication system 130.

UE device 110 may include any device with wireless communication functionality (e.g., using a cellular or mobile wireless network, using a WiFi Access Point (AP), etc.). In some implementations, UE device 110 may communicate with network 120 using a wired connection. UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and a user interface. UE device 110 may include capabilities for voice communication, mobile broadband services (e.g., video streaming, real-time gaming, premium Internet access etc.), best effort data traffic, and/or other types of applications.

Network 120 may include, and/or be connected to and enable communication with, a local area network (LAN), a wide area network (WAN), a metropolitan area network (MAN), an optical network, a cable television network, a satellite network, a wireless network (e.g., a Fourth Generation (4G) Long Term Evolution (LTE) network, a Fifth Generation (5G) New Radio (NR) network, a Code Division Multiple Access (CDMA) network, a general packet radio service (GPRS) network, and/or another type of wireless network), an ad hoc network, a telephone network (e.g., the Public Switched Telephone Network (PSTN) or a cellular network), an intranet, or a combination thereof.

In some implementations, network 120 may include an IP Multimedia Subsystem (IMS) network (not shown in FIG. 1). An IMS network may include a network for delivering IP multimedia services and may provide media flows between two different UE devices 110, and/or between a particular UE device 110 and external IP networks or external circuit-switched networks (not shown in FIG. 1).

In some implementations, network 120 may include an LTE Advanced (LTE-A) network and/or a 5G core network or other advanced network that includes functionality such as management of 5G NR base stations in radio access network 120, which may implement carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band IoT (NB-IoT) technology, and/or other types of MTC technology; and/or other types of LTE-A and/or 5G functionality.

Network 120 may include one or more base stations 125. Base station 125 may include a 4G LTE base station (e.g., an evolved Node B (eNodeB)) or a 5G NR base station (e.g., a next generation Node B (gNodeB)). Base station 125 may include one or more radio frequency (RF) transceivers (also referred to as "cells" and/or "base station sectors") facing particular directions. For example, base station 125 may include three RF transceivers and each RF transceiver may service a 120° sector of a 360° field of view. In some implementations, base station 125 may include a mobile edge computing (MEC) system that performs cloud computing and/or network processing services for UE devices 110.

CAPTCHA authentication system 130 may include one or more devices, such as computer devices and/or server devices, which perform CAPTCHA authentication for UE device 110. For example, CAPTCHA authentication system 30 may communicate with UE device 110 via network 120 to provide a CAPTCHA presentation image to UE device 110, receive an image captured by a camera of UE device 110 along with alignment information associated with the CAPTCHA presentation image obtained when the image was captured by the camera of the UE device 110, and generate a CAPTCHA authentication determination based on the alignment information. For example, if CAPTCHA authentication system 130 determines that a virtual object in the presentation image was correctly aligned with a real object in the user's environment in an augmented reality image that includes the virtual object overlaid on the image of the user's environment, CAPTCHA authentication system 130 may verify that the user of UE device 110 is a human user, rather than a computer.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

FIGS. 2A and 2B are front and rear diagrams, respectively, illustrating exemplary components of UE device 110. As shown in FIGS. 2A and 2B, UE device 110 may include a housing 205, a touchscreen 210, a microphone 220, a front camera 230, a button 240, a speaker 250, and a back camera 260.

Housing 205 may enclose UE device 110 and protect the components of UE device 110 from the outside elements (e.g., moisture, dirt, etc.). Touchscreen 210 may include a display device and an input device configured to detect a user's touch. Touchscreen 210 may include a liquid crystal display (LCD), a light emitting diode (LED) display, an electronic ink display (e.g., an electrophoretic display), an electroluminescent display, and/or another type of display. Touchscreen 210 may include touch sensors, such as capacitive sensors (e.g., surface capacitive sensors, projected capacitive touch sensors, etc.), resistive sensors (e.g., analog resistive sensors, digital resistive sensors, etc.), optical sensors (e.g., optical imaging sensors, rear diffused illumination sensors, infrared grid sensors, diffused surface illumination sensors, etc.), acoustic wave sensors (e.g., surface acoustic wave sensors, bending wave sensors, etc.), and/or another type of touch sensors. Touchscreen 210 may additionally include sensors to sense the amount of force applied to touchscreen 210, such as piezoresistive sensors.

Microphone 220 may receive audio signals and convert the received audio signals to electrical signals for UE device 110. Front camera 230 may include an array of digital image sensors, such as charged-couple device (CCD) sensors, complementary metal-oxide-semiconductor (CMOS) sensors, and/or other types of digital image sensors configured to capture color optical images. For example, front camera 230 may obtain Red, Green, and Blue (RGB) values for each pixel in a captured optical image.

Button 240 may be used to perform particular functions, such as displaying a home screen on touchscreen 220. Speaker 250 may receive electrical signals from within UE device 110 and generate audio signals based on the received electrical signals. Back camera 260 may include an array of digital image sensors similar to as described above for front camera 230. Additionally, back camera 260 may be configured to obtain depth information. For example, back camera 260 may obtain a depth value for each pixel in addition to RGB values. In some implementations, back camera 260 may project a pattern of infrared (IR) beams on a scene being photographed and one or more IR sensors may detect reflected IR signals to determine the depth information. In other implementations, back camera 260 may include an array of multiple digital image sensors (e.g., a 4×4 array of sensors) and may determine depth information using parallax detection and/or super-resolution techniques.

Although FIGS. 2A and 2B show exemplary components of UE device 110, in other implementations, UE device 110 may include fewer components, different components, differently arranged components, or additional components than depicted in FIG. 2A or 2B. Additionally, or alternatively, one or more components of UE device 110 may perform functions described as being performed by one or more other components of UE device 110.

Figure 3:
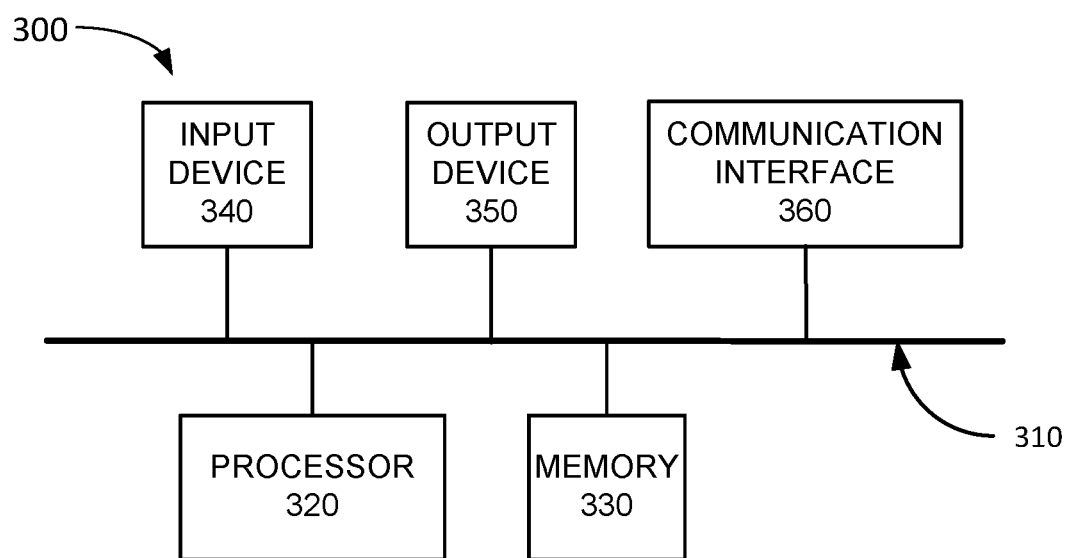
FIG. 3 is a diagram illustrating exemplary components of a device that may be included in a component of FIG. 1 according to an implementation described herein.

FIG. 3 illustrates example components of a device 300 according to an implementation described herein. UE device 110, base station 125, and/or CAPTCHA authentication system 130, may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the user. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to one or more antennas/antenna arrays for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to CAPTCHA authentication using pairing of virtual and real objects. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hard-wired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
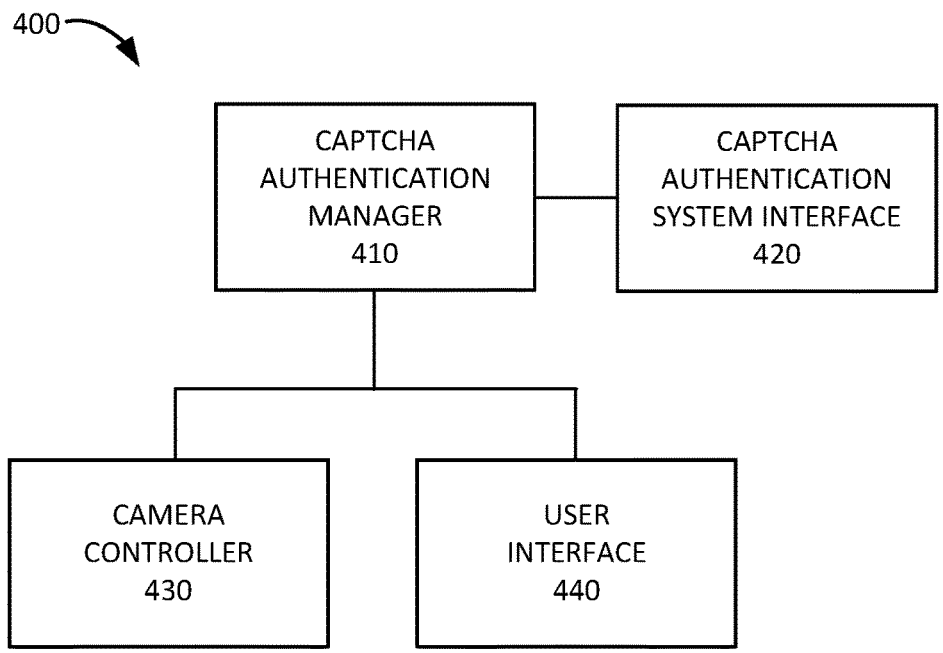
FIG. 4 is a diagram illustrating exemplary components of the user device of FIG. 1 according to an implementation described herein.

FIG. 4 illustrates exemplary components of a CAPTCHA application 400 installed on UE device 110. The components of CAPTCHA application 400 may be implemented, for example, via processor 320 executing instructions from memory 330. Alternatively, some or all of the components of CAPTCHA application 400 may be implemented via hard-wired circuitry. CAPTCHA application 400 may be activated when another application or process running on UE device 110 receives or generates a request to perform CAPTCHA authentication for the user of UE device 110. As shown in FIG. 4, CAPTCHA application 400 may include a CAPTCHA authentication manager 410, a CAPTCHA authentication system interface 420, a camera controller 430, and a user interface 440.

CAPTCHA authentication manager 410 may manage CAPTCHA authentication events in UE device 110. For example, CAPTCHA authentication manager 410 may direct CAPTCHA authentication system interface 420 to request a CAPTCHA presentation image from CAPTCHA authentication system 130 and may display the CAPTCHA presentation image via user interface 440. CAPTCHA authentication manager 410 may further instruct camera controller 430 to obtain an image of the user's surroundings. When the user activates a submit button after aligning a CAPTCHA presentation image with an object in the user's surroundings as seen in an image obtained by camera controller 430, CAPTCHA authentication manager 410 may request an authentication determination from CAPTCHA authentication system 130 and may provide the authentication determination to an application or process that requested the CAPTCHA authentication.

CAPTCHA authentication system interface 420 may be configured to communicate with CAPTCHA authentication system 130. For example, CAPTCHA authentication system interface 420 may request a CAPTCHA presentation image from CAPTCHA authentication system 130, may provide a captured camera image, along with alignment information for a received presentation or augmented image back to CAPTCHA authentication system 130, and may receive an authentication determination from CAPTCHA authentication system 130 in response.

Camera controller 430 may be configured to control back camera 260 and/or front camera 230 to obtain an image of the user's surroundings. User interface 440 may be configured to receive input from the user and/or to display a CAPTCHA presentation image to the user by augmenting an image obtained by camera controller 430. For example, user interface 440 may enable the user to move/rotate/resize the CAPTCHA presentation image on touchscreen 210 and/or to move UE device 110 to align an object in the user's surroundings as displayed on touchscreen 210 via back camera 260 and/or front camera 230 with the CAPTCHA presentation image. Furthermore, user interface 440 may enable the user to submit a captured and/or augmented image when the user is satisfied with the alignment. Moreover, user interface 440 may provide a reload button to request another CAPTCHA presentation image, for situations when the user is unable or unwilling to work with a particular CAPTCHA presentation image.

Although FIG. 4 shows exemplary components of CAPTCHA application 400, in other implementations, CAPTCHA application 400 may include fewer components, different components, additional components, or differently arranged components than depicted in FIG. 4. Additionally, or alternatively, one or more components of CAPTCHA application 400 may perform one or more tasks described as being performed by one or more other components of CAPTCHA application 400.

Figure 5:
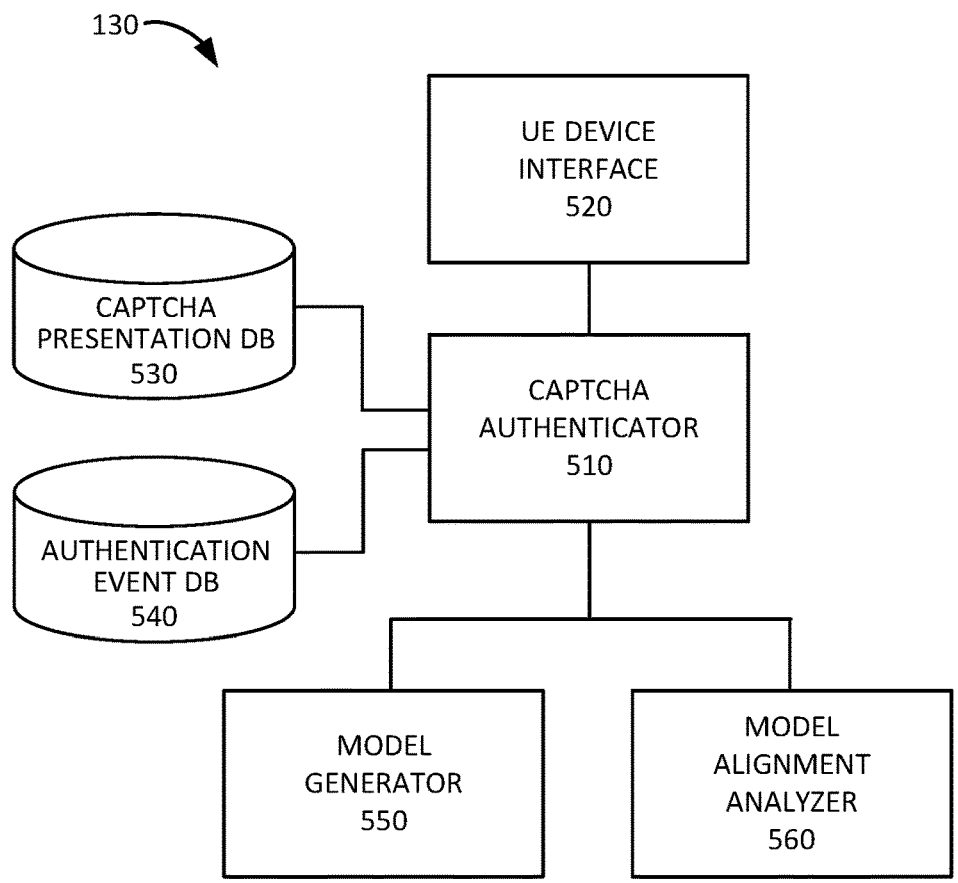
FIG. 5 is a diagram illustrating exemplary components of the completely automated public Turing test to tell computers and humans apart (CAPTCHA) authentication system of FIG. 1 according to an implementation described herein.

FIG. 5 illustrates exemplary components of a CAPTCHA authentication system 130. The components of CAPTCHA authentication system 130 may be implemented, for example, via processor 320 executing instructions from memory 330. Alternatively, some or all of the components of CAPTCHA authentication system 130 may be implemented via hard-wired circuitry. As shown in FIG. 5, CAPTCHA authentication system 130 may include a CAPTCHA authenticator 510, a UE device interface 520, a CAPTCHA presentation database (DB) 530, an authentication event DB 540, a model generator 550, and a model alignment analyzer 560.

CAPTCHA authenticator 510 may manage CAPTCHA authentication events for UE devices 110. For example, CAPTCHA authenticator 510 may receive a request for a CAPTCHA presentation from UE device 110, select a presentation image from CAPTCHA presentation DB 530, and provide the selected presentation image to UE device 110. CAPTCHA authenticator 510 may then receive, from UE device 110, an image captured by a camera of UE device 110 along with alignment information for the presentation image on the display of UE device 110 when the image was captured. CAPTCHA authenticator 510 may then generate an authentication determination that either authenticates the user as a human user or does not authenticate the user as a human user based on the received image and alignment information, using model generator 550 and model alignment analyzer 560.

UE device interface 520 may be configured to communicate with UE device 110 to receive requests for a CAPTCHA presentation image, to receive an image captured by a camera of UE device 110 along with alignment information for a CAPTCHA presentation image, and/or to provide an authentication determination to UE device 110.

CAPTCHA presentation DB 530 may store information relating to CAPTCHA presentation images. Exemplary information that may be stored in CAPTCHA presentation DB 530 is described below with reference to FIG. 6A. Authentication event DB 540 may store information relating to particular CAPTCHA authentication events. Exemplary information that may be stored in authentication event DB 540 is described below with reference to FIG. 6B.

Model generator 550 may generate an object model based on a received image captured by a camera of UE device 110. In some implementations, the generated model may correspond to a two-dimensional (2D) model. A 2D model may be generated using object recognition techniques, such as edge detection, edge matching, shape detection, gradient matching, histogram analysis, and/or another type of object recognition. In other implementations, the generated model may correspond to a 3D model generated based on depth information associated with the image.

In some implementations, a 3D model may be generated by using a point cloud using an Iterative Closest Point (ICP) method and/or another method. In other implementations, a 3D model may be generated using polygonal modeling. In yet other implementations, a 3D model may be generated using digital sculpting. In yet other implementations, a 2D and/or a 3D model may be generating using a trained machine learning model. As an example, a convolutional neural network (CNN), and/or another type of deep learning artificial neural network, may be trained to generate a 3D model based on a depth camera image.

Furthermore, model generator 550 may perform object recognition on a generated 3D model to identify an object in the generated 3D model and/or to determine whether a particular object is included in a generated 3D model. In some implementations, object recognition may be performed by comparing a generated 3D model to models of particular objects and determining whether a difference between a generated 3D model and a model of a particular object is less than a difference threshold. In other implementations, object recognition may be performed using a machine learning model trained to identify particular objects, such as a deep learning artificial neural network classifier, a linear classifier, a naïve Bayesian classifier, a kernel density estimator classifier, a support vector machine classifier, a maximum entropy classifier, a decision tree classifier, a random forest classifier, and/or another type of classifier.

Model alignment analyzer 560 may determine an alignment between two models and further determine whether the alignment satisfies an alignment requirement. For example, model alignment analyzer 560 may determine the alignment of a first model, associated with a presentation image, with a second model, generated based a received image captured by a camera of UE device 110, based on the alignment information for the presentation image received from UE device 110 when the received image was captured by the camera of UE device 110 or when the user selected to submit the image for CAPTCHA authentication.

In some implementations, model alignment analyzer 560 may select a first set of points from the aligned first model, associated with a presentation image, and a second set of points from the second model, generated based a received image captured by a camera of UE device 110, and determine whether at least a particular number of the first points are each within a particular distance of corresponding points in the second set of points. In other implementations, model alignment analyzer 560 may compute a first centroid for the first model, compute a second centroid for the second model, and may determine whether the first centroid is within a particular distance of the second centroid. In yet other implementations, model alignment analyzer 560 may determine if at least a particular percentage of the volume of the first model is within a space occupied by the volume of the second model. In yet other implementations, model alignment analyzer 560 may determine if the first model is sufficiently aligned with the second model to authenticate the user of UE device 110 as a human user using a different alignment determination technique.

Although FIG. 5 shows exemplary components of CAPTCHA authentication system 130, in other implementations, CAPTCHA authentication system 130 may include fewer components, different components, additional components, or differently arranged components than depicted in FIG. 5. Additionally, or alternatively, one or more components of CAPTCHA authentication system 130 may perform one or more tasks described as being performed by one or more other components of CAPTCHA authentication system 130.

Figure 6A:
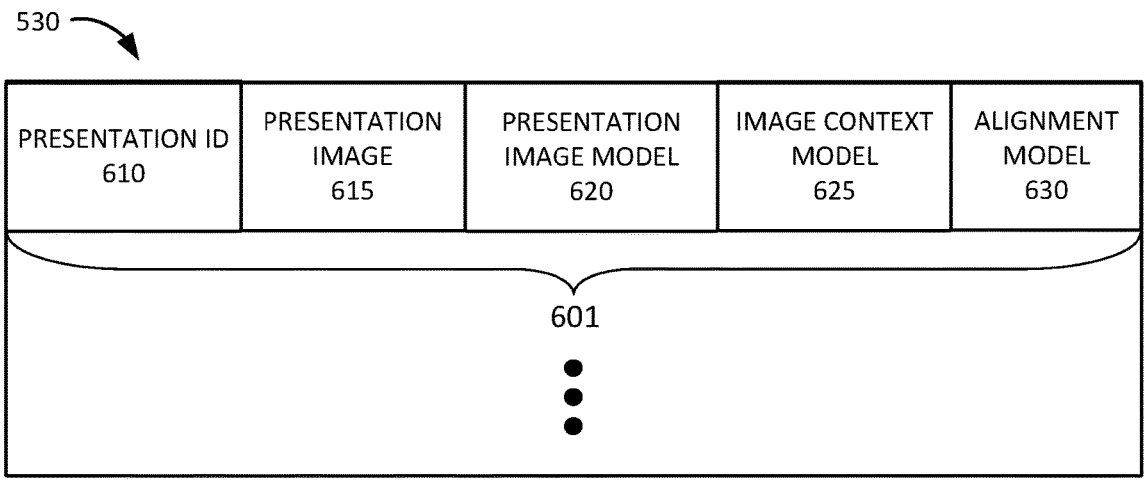
FIG. 6A is a diagram illustrating exemplary components of the CAPTCHA presentation database (DB) of FIG. 5 according to an implementation described herein.

FIG. 6A illustrates exemplary components of CAPTCHA presentation DB 530. As shown in FIG. 6A, CAPTCHA presentation DB 530 may include one or more CAPTCHA presentation records 601. Each CAPTCHA presentation record 601 may store information relating to a particular CAPTCHA presentation image. CAPTCHA presentation record 601 may include a presentation identifier (ID) field 610, a presentation image field 615, a presentation image model field 620, an image context model field 625, and an alignment model field 630.

Presentation ID field 610 may store an ID associated with a particular presentation image. Presentation image field 615 may store the particular presentation image of a particular object. Presentation image model field 620 may store a 2D or a 3D model of the particular object depicted in the particular presentation image. Image context model field 625 may store a 2D or 3D model of a context associated with the particular object. Alignment model 630 may store information identifying a correct alignment of the model of the particular object with the model of the context associated with the particular object. For example, alignment model 630 may specify that particular points, or other types of elements, of the particular object be located within a particular distance of particular points, or other types of elements, of the model of the context associated with the particular object.

Although FIG. 6A shows exemplary components/fields of CAPTCHA presentation DB 530, in other implementations, CAPTCHA presentation DB 530 may store fewer components/fields, different components/fields, additional components/fields, or differently arranged components/fields than depicted in FIG. 6A. Additionally, or alternatively, one or more components/fields of CAPTCHA presentation DB 530 may store information described as being stored by one or more other components/fields of CAPTCHA presentation DB 530.

Figure 6B:
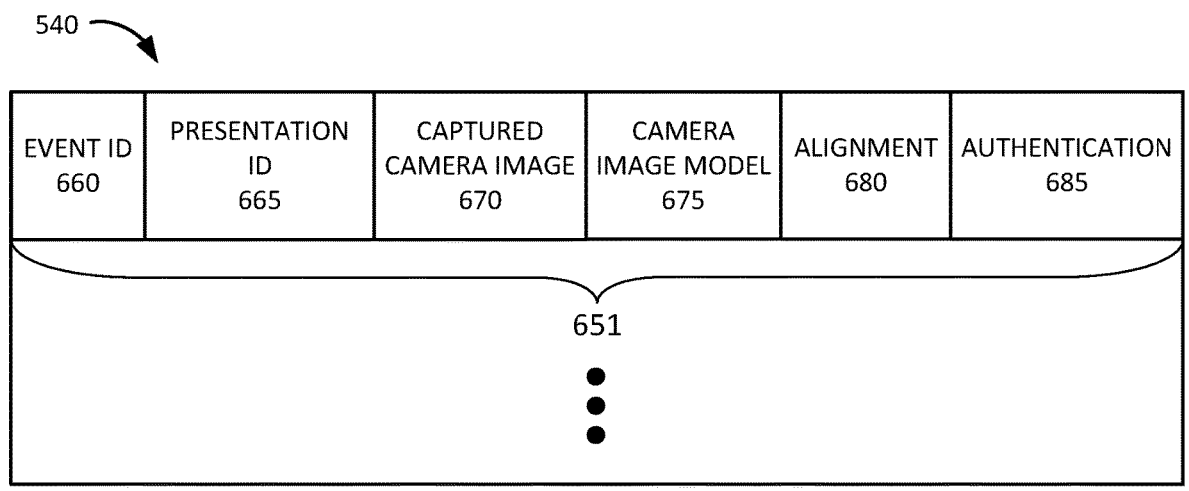
FIG. 6B is a diagram illustrating exemplary component of the authentication event DB of FIG. 4 according to an implementation described herein.

FIG. 6B illustrates exemplary components of authentication event DB 540. As shown in FIG. 6B, authentication event DB 540 may include one or more authentication event records 651. Each authentication event record 651 may store information relating to a particular authentication event. Authentication event record 651 may include an event ID field 660, a presentation ID field 665, a captured camera image field 670, a camera image model field 675, an alignment field 680, and an authentication field 685.

Event ID field 660 may store an ID that uniquely identifies a particular authentication event. For example, event ID field 660 may include a timestamp associated with the particular authentication event, a UE device ID that identifies a particular UE device 110 associated with the authentication event, an application ID that identifies a particular application associated with the authentication event, a Uniform Resource Locator (URL) associated with the authentication event, and/or other types of identifying information associated with the authentication event.

Presentation ID field 665 may store information identifying a particular presentation image from CAPTCHA presentation DB 530 associated with the particular authentication event. Captured camera image field 670 may store an image captured by the camera of UE device 110 in response to receiving the particular presentation image. Camera image model 675 may store a camera image model generated by model generator 550 based on the image stored in captured camera image field 670. Alignment field 680 may store alignment information received in connection with the image captured by the camera of UE device 110. For example, alignment field 680 may store the position, orientation, and/or size of the presentation image on touchscreen 210 of UE device 110 when the image was captured by front camera 230 or back camera 260 of UE device 110. Authentication field 685 may store an authentication determination associated with the particular authentication event. For example, authentication field 685 may store information identifying whether the user of UE device 110 was authenticated as being a human user.

Although FIG. 6B shows exemplary components/fields of authentication event DB 540, in other implementations, authentication event DB 540 may store fewer components/fields, different components/fields, additional components/fields, or differently arranged components/fields than depicted in FIG. 6B. Additionally, or alternatively, one or more components/fields of authentication event DB 540 may store information described as being stored by one or more other components/fields of authentication event DB 540.

Figure 7:
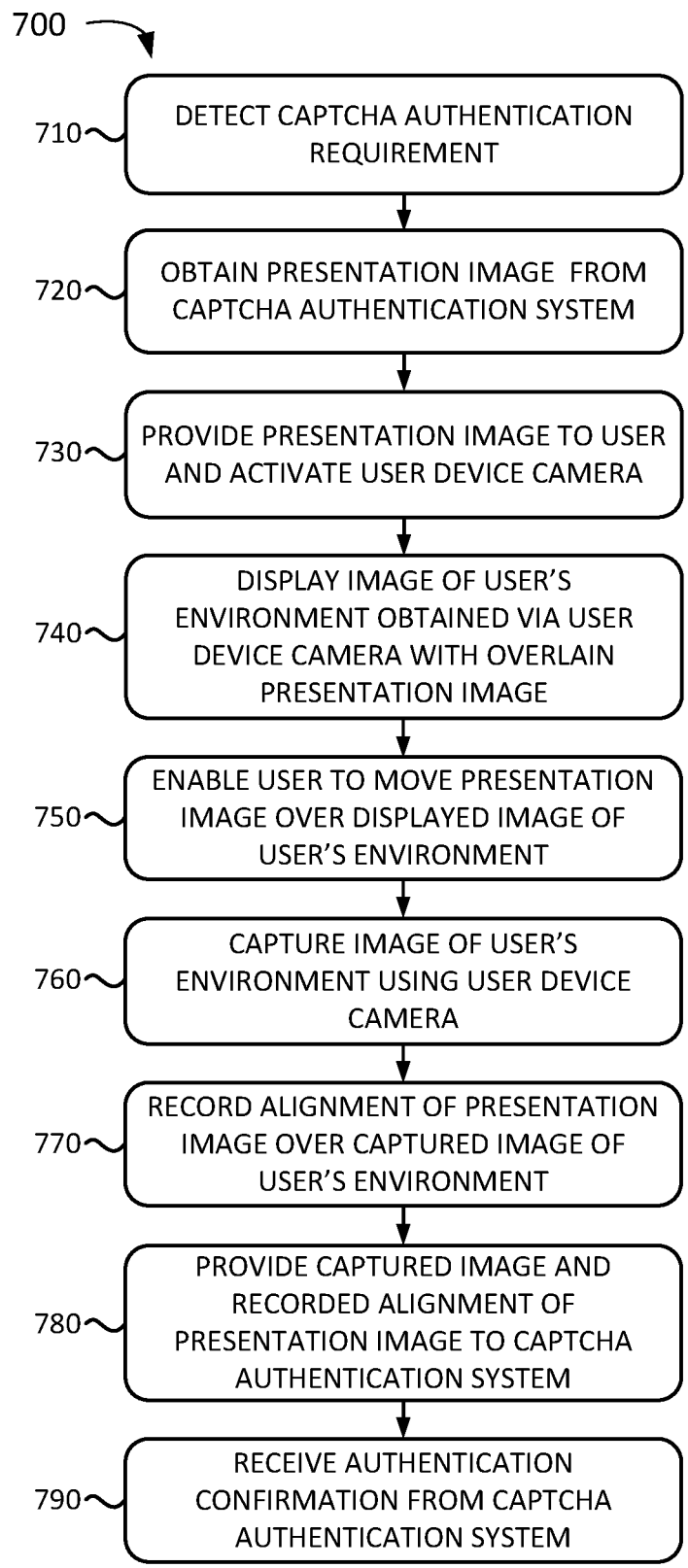
FIG. 7 is a flowchart of a first process for performing a CAPTCHA authentication according to an implementation described herein.

FIG. 7 is a flowchart 700 of a first process for performing a CAPTCHA authentication according to an implementation described herein. In some implementations, the process of FIG. 7 may be performed by UE device 110. In other implementations, some or all of the process of FIG. 7 may be performed by another device or a group of devices separate from UE device 110.

The process of FIG. 7 may include detecting a CAPTCHA authentication requirement (block 710). As an example, the user may visit a particular website using a browser application and the particular website may require CAPTCHA authentication from UE device 110. In response, the browser application may activate CAPTCHA application 400. As another example, the user may activate an application that communicates with a server device that requires CAPTCHA authentication before the application is allowed to use the resources of the server device. In response, the application may activate CAPTCHA application 400.

A presentation image may be obtained from CAPTCHA authentication system 130 (block 720) and the presentation image may be provided to the user and a camera of UE device 110 may be activated (block 730). For example, CAPTCHA application 400 may request a presentation image from CAPTCHA authentication system 130, display the presentation image on touchscreen 210 of UE device 110, and activate a camera of UE device 110 (e.g., front camera 230 or back camera 260). Some presentation images may cause CAPTCHA application 400 to automatically activate back camera 260 and other presentation images may cause CAPTCHA application 400 to automatically activate front camera 230 (e.g., presentation images that may require the user to capture an image of the user's face). If the user does not like the received presentation image, the user may request another presentation image by pressing a reload button displayed on the screen of UE device 110 by CAPTCHA application 400.

An image of the user's environment obtained via the camera of UE device 110 may be displayed with the presentation image overlaid on the image (block 740) and the user may be enabled to move the presentation image over the displayed image (block 750). For example, CAPTCHA application 400 may display the presentation image overlaid with an image captured by front camera 230 or back camera 260. The user may align the virtual object in the presentation image with a real object in the user's environment by moving UE device 110 around and/or by moving the user's body part (if the real object to be aligned with the virtual object is a part of the user's body). Additionally, or alternatively, the user may drag, rotate, and/or resize the presentation image on the display to align the presentation image with the real object in the user's environment displayed on the screen. For example, the user may first capture an image of the real object, and then manipulate the presentation image to align the presentation image with the image of the real object in the captured image to create an augmented image.

An image of the user's environment may be captured (block 760) and the alignment of the presentation image over the captured may be recorded (block 770). For example, when the user is satisfied with the alignment of the virtual object in the presentation image with the real object in the image captured by the camera, the user may press a submit button to submit the aligned virtual object with the real object for CAPTCHA authentication.

The captured image and recorded alignment of the presentation image may be provided to CAPTCHA authentication system 130 (block 780) and an authentication confirmation may be received from CAPTCHA authentication system 130 (block 790). For example, CAPTCHA application 400 may send the image captured by the camera, along with the alignment information of the presentation image on the display, to CAPTCHA authentication system 130. CAPTCHA application 400 may then receive an authentication determination from CAPTCHA authentication system 130 in response. The authentication determination may either include a confirmation that the user of UE device 110 is a human (i.e., successful authentication) or an authentication denial. If the authentication determination corresponds to a successful authentication, the website or application that requested the CAPTCHA authentication may enable UE device 110 to proceed with using the website or application.

Figure 8:
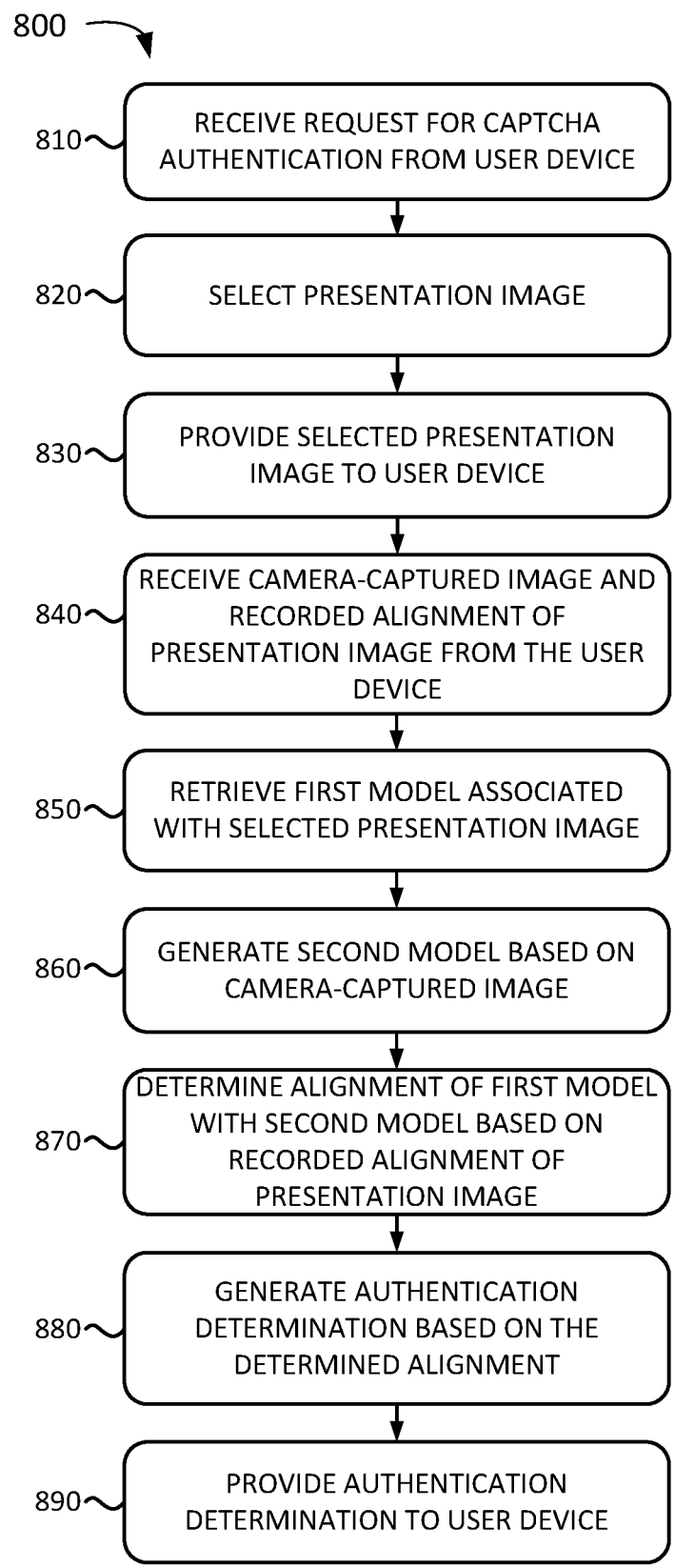
FIG. 8 is a flowchart of a second process for performing a CAPTCHA authentication according to an implementation described herein.

FIG. 8 is a flowchart of a second process for performing a CAPTCHA authentication according to an implementation described herein. In some implementations, the process of FIG. 8 may be performed by CAPTCHA authentication system 130. In other implementations, some or all of the process of FIG. 8 may be performed by another device or a group of devices separate from CAPTCHA authentication system 130.

The process of FIG. 8 may include receiving a request for CAPTCHA authentication from UE device 110 (block 810), selecting a presentation image (block 820), and providing the selected presentation image to UE device 110 (block 830). For example, CAPTCHA authentication system 130 may receive a request for a presentation image from UE device 110, select a presentation image from CAPTCHA presentation DB 530, and provide the presentation image to UE device 110. Furthermore, CAPTCHA authentication system 130 may generate a new authentication event record 651 in authentication event DB 540 based on the received request.

A camera-captured image may be received along with a recorded alignment of the presentation image from UE device 110 (block 840). For example, CAPTCHA authentication system 130 may receive an image captured by a camera of UE device 110 from UE device 110 along with alignment information recording the position of the presentation image on the display of UE device 10 when the image was captured by the camera or when the user selected to submit the captured image. The received information may be stored in authentication event record 651 associated with the authentication event for UE device 110 (e.g., in captured camera image field 670 and/or alignment field 680).

A first model associated with the presentation image may be retrieved (block 850) and a second model may be generated based on the camera-captured image (block 860). CAPTCHA authentication system 130 may retrieve the first model from presentation image model field 620 of presentation record 601 associated with the selected presentation image. Furthermore, CAPTCHA authentication system 130 may use model generator 550 to generate a second model based on the captured camera image that was received from UE device 110. In some implementations, model generator 550 may further perform object recognition to identify one or more objects in the generated second model. In some implementations, CAPTCHA authentication may be based on whether a particular object is identified in the second model that matches an object specified in image context model field 625 of presentation record 601 associated with the selected presentation image. For example, if the specified object is not identified in the second model, UE device 110 may not be authenticated. Model generator 550 may further select a particular identified object from the second model, corresponding to the object specified in image context model field 625, as the relevant portion of the second model with which to align the first model.

An alignment of the first model with the second model may be determined based on the recorded alignment of the presentation image (block 870). CAPTCHA authentication system 130 may use model alignment analyzer 560 to determine whether the alignment of retrieved first model with the generated second model satisfies the alignment requirements stored in alignment model field 630 of presentation record 601 associated with the selected presentation image. Model alignment analyzer 560 may plot the retrieved first model onto the generated second model using the alignment information received from UE device 110. For example, the alignment information may include the coordinates of the center of the presentation image on the screen of UE device 110 and the first model may be plotted with the center of the first model aligned with the coordinates of the center of the presentation image. If the first model and the second model correspond to 3D models, the first model may then be moved or modified in the third dimension to align the first model with the second model based on the coordinates of the second model determined based on the depth information included in the captured camera image. Model alignment analyzer 560 may then determine whether the first model and the second model satisfy the alignment requirements specified in alignment model field 630 of presentation record 601 associated with the selected presentation image.

An authentication determination may be generated based on the determined alignment (block 880) and the authentication determination may be provided to UE device 110 (block 890). For example, if CAPTCHA authentication system 130 determines that the correct object was identified in the second model generated from the received captured camera image, and/or determines that the second model was sufficiently aligned with the first model, CAPTCHA authentication system 130 may send an authentication determination to UE device 110 that authenticates UE device 110 and indicates that the CAPTCHA challenge was successfully completed. If the correct object was not identified in the second model, or if the second model was not sufficiently aligned with the first model, CAPTCHA authentication system 130 may not send an authentication to UE device 110 or may send an authentication denial to UE device 110.

Figure 9A:
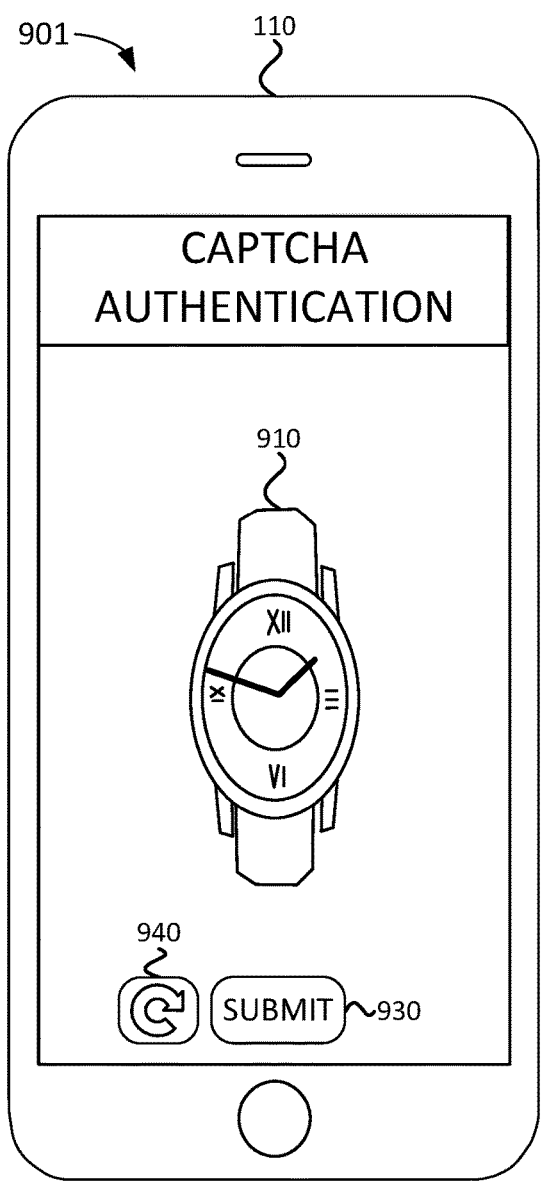
FIGS. 9A-9E are diagrams of a first set of exemplary user interfaces according to an implementation described herein.

FIGS. 9A-9E are diagrams of a first set of exemplary user interfaces according to an implementation described herein. UE device 110 may display a user interface 901 generated by CAPTCHA application 400 when CAPTCHA application 400 requests and receives a presentation image from CAPTCHA authentication system 130. As shown in FIG. 9A, user interface 901 may include a presentation image 910, a submit button 930, and a reload button 940. The user may press submit button 930 when the user wants to submit the response to the CAPTCHA challenge associated with presentation image 910. Alternatively, the user may submit the answer using a different method, such as by speaking a verbal command into microphone 220, moving UE device 110 in a particular pattern identified by one or more positions sensors in UE device 110, by pressing button 240, and/or using a different technique. If the user wants to request a different presentation image, the user may press reload button 940.

In the example of user interface 901, presentation image 910 includes an image of a wristwatch. Furthermore, back camera 260 of UE device 110 may be activated to display the user's environment. In order to complete the CAPTCHA challenge, the user is tasked with aligning the image of the wristwatch with the user's wrist.

Figure 9B:
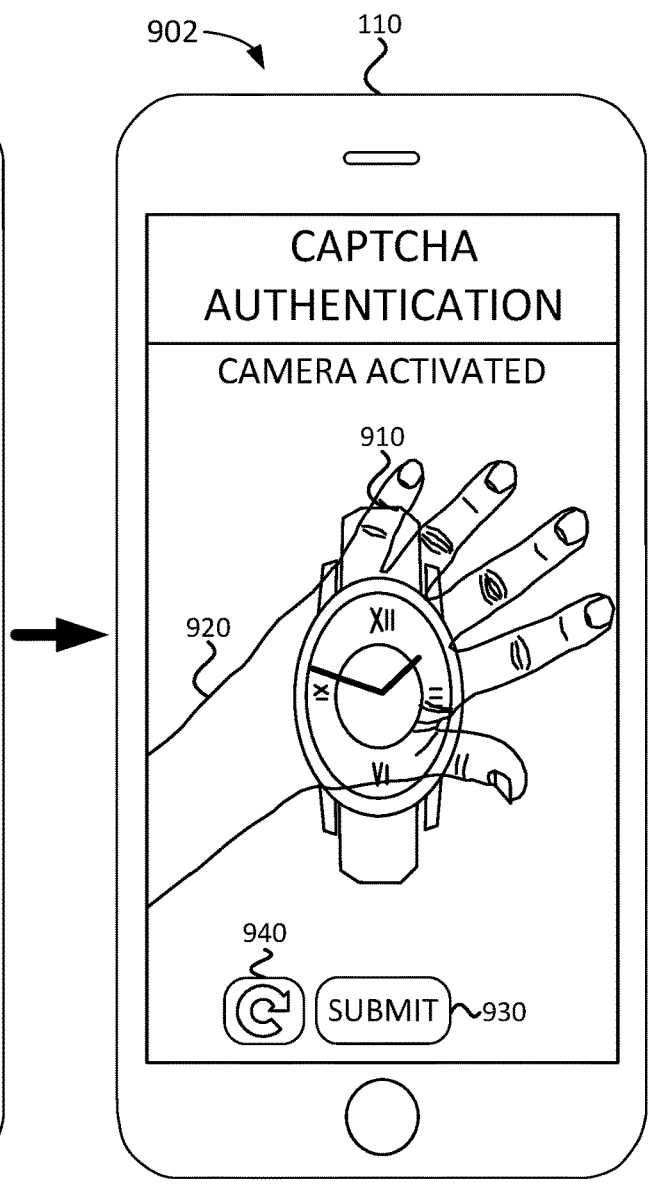
Figures 9C, 9D:
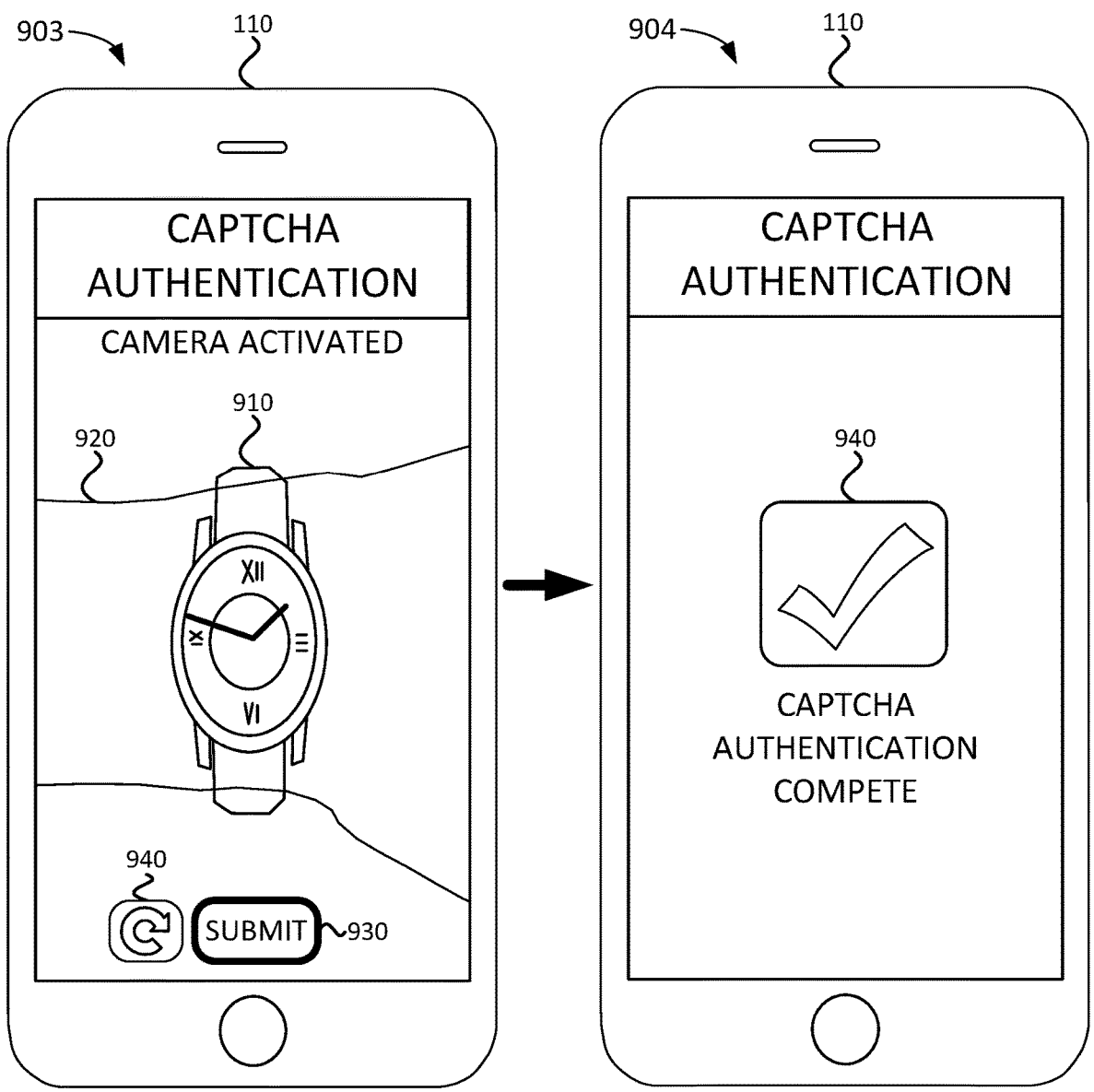
Figure 9E:
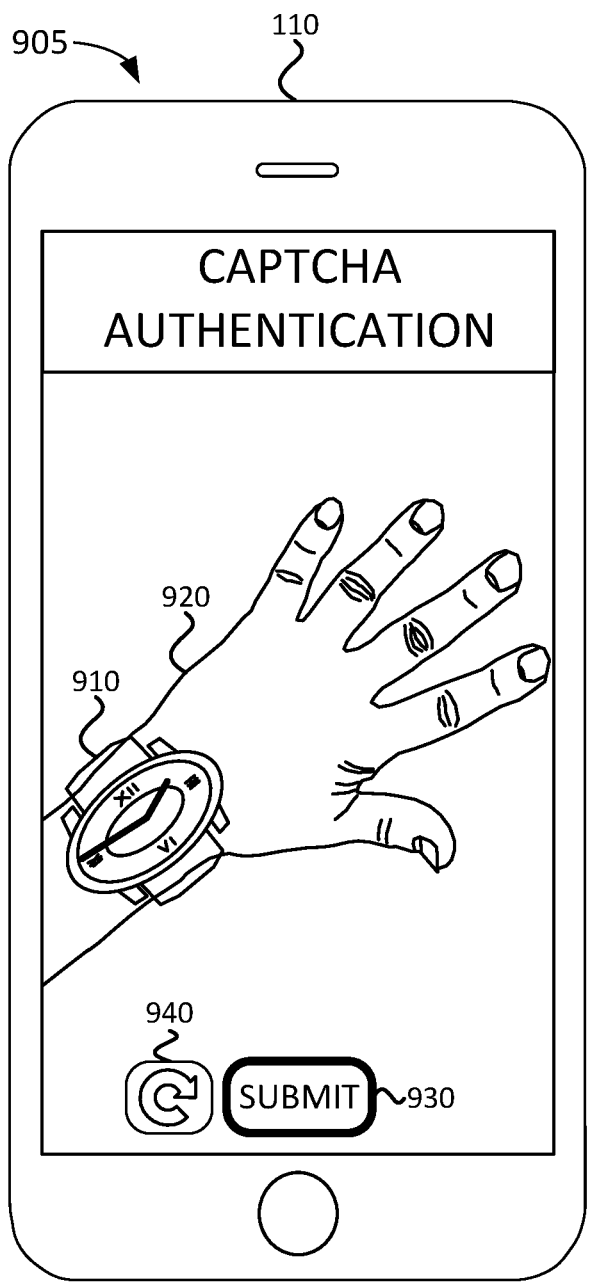

Turning to FIG. 9B, user interface 902 shows the display of UE device 110 after the user places his or her hand in the field of view of back camera 260. The user is now tasked with moving presentation image 910 of the wristwatch over the user's wrist 920. The user may position his or her wrist 920 in a position that aligns the user's wrist 920 with the wristwatch in presentation image 910, as shown in user interface 903 in FIG. 9C. The user may then press submit button 930. As shown in user interface 904 in FIG. 9D, CAPTCHA application 400 may respond with a CAPTCHA authentication 940, indicating the user has been authenticated as a human user and that the CAPTCHA challenge has been successfully completed. FIG. 9E illustrates user interface 905, which shows an alternative technique the user may use to align the wristwatch with the user's wrist 920. Rather than moving UE device 110 and/or the user's hand to align the user's wrist 920 with the wristwatch, the user may capture an image of the user's wrist 920 and then drag and rotate presentation image 910 to align the wristwatch on top of the captured image. The user may then press submit button 930 to complete the CAPTCHA challenge.

FIGS. 10A-10B are diagrams of a second set of exemplary user interfaces according to an implementation described herein. As shown in FIG. 10A, user interface 1001 may include a presentation image 1010, a submit button 1030, and a reload button 1040. In the example of user interface 1001, presentation image 1010 includes an image of a ring. Furthermore, back camera 260 of UE device 110 may be activated to display the user's environment. In order to complete the CAPTCHA challenge, the user is tasked with aligning the image of the ring with the user's finger. The user may position his or her finger 1020 in a position that aligns the user's finger 1020 with the ring in presentation image 1010, as shown in user interface 1002 in FIG. 10B, and then press submit button 1030.

Figure 11A:
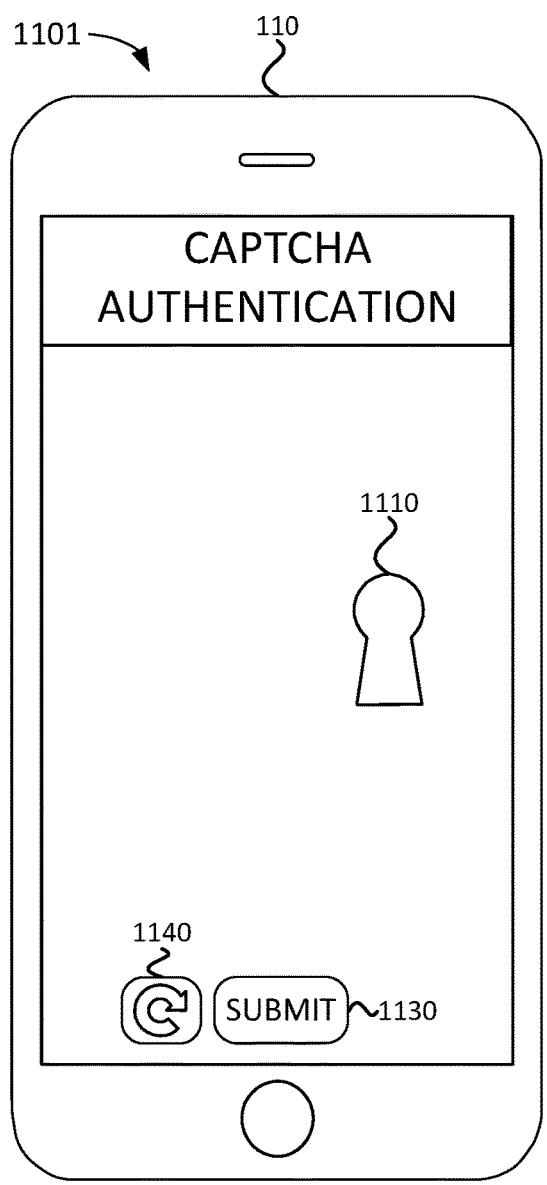
FIGS. 11A-11B are diagrams of a third set of exemplary user interfaces according to an implementation described herein.
Figure 11B:
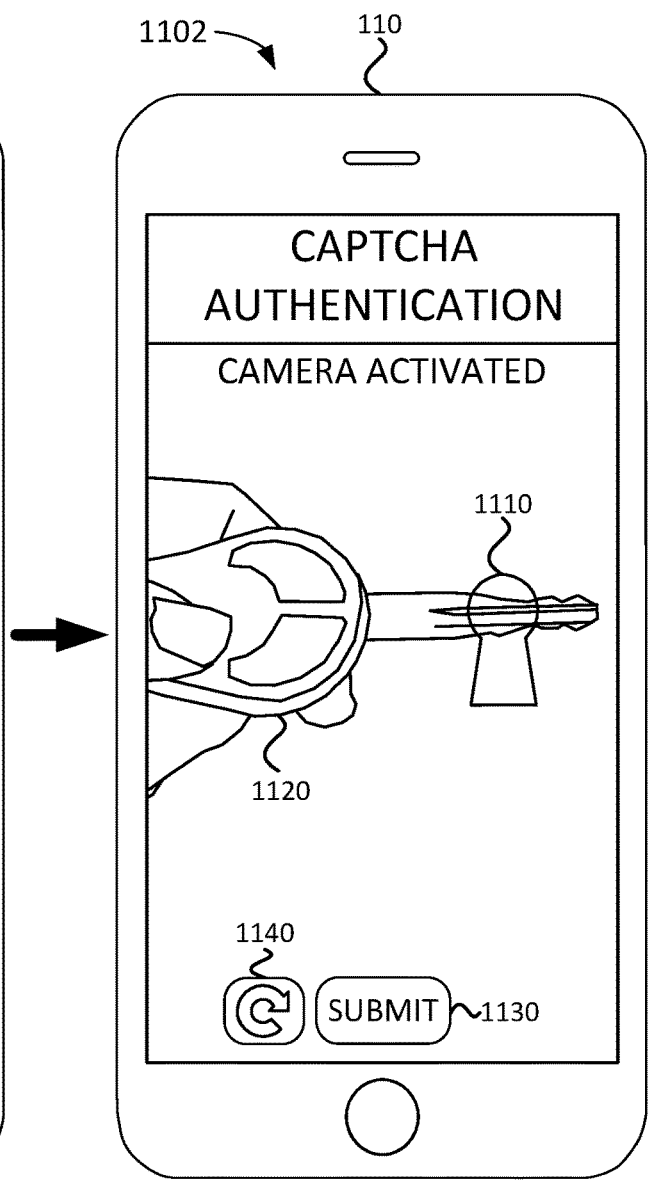

The examples of FIGS. 9A-9E and FIGS. 10A-10B illustrate a CAPTCHA challenge in which a first model, associated with an object in the presentation image, represents an object wearable by a user, and in which a second model, with which the first model is to be aligned by the user, represents a body part used to wear the object wearable by the user. FIGS. 11A-11B are diagrams of a third set of exemplary user interfaces according to an implementation described herein. FIGS. 11A-11B illustrate a CAPTCHA challenge in which a first model, associated with an object in the presentation image, represents a first object, and in which a second model, with which the first model is to be aligned by the user, represents a second model couplable to the first object.

As shown in FIG. 11A, user interface 1101 may include a presentation image 1110, a submit button 1130, and a reload button 1140. In the example of user interface 1101, presentation image 1110 includes an image of a keyhole. Furthermore, back camera 260 of UE device 110 may be activated to display the user's environment. In order to complete the CAPTCHA challenge, the user is tasked with aligning the image of the keyhole with a key in the user's possession. The user may align a key 1120 in a position that aligns key 1120 with the keyhole in presentation image 1110, as shown in user interface 1102 in FIG. 11B, and then press submit button 1130.

Figure 12A:
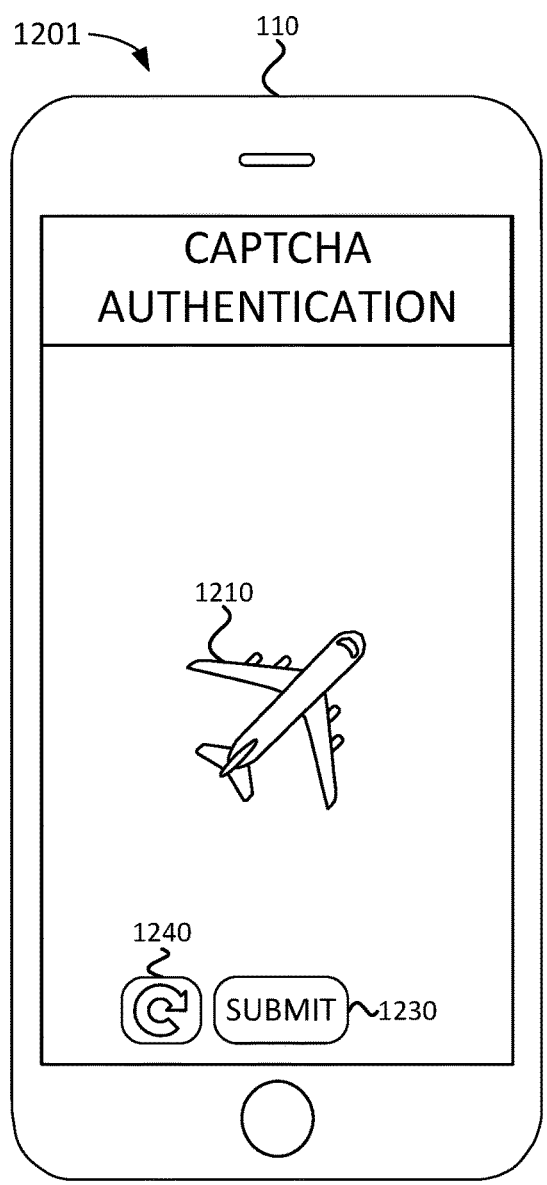
FIGS. 12A-12B are diagrams of a fourth set of exemplary user interfaces according to an implementation described herein.
Figure 12B:
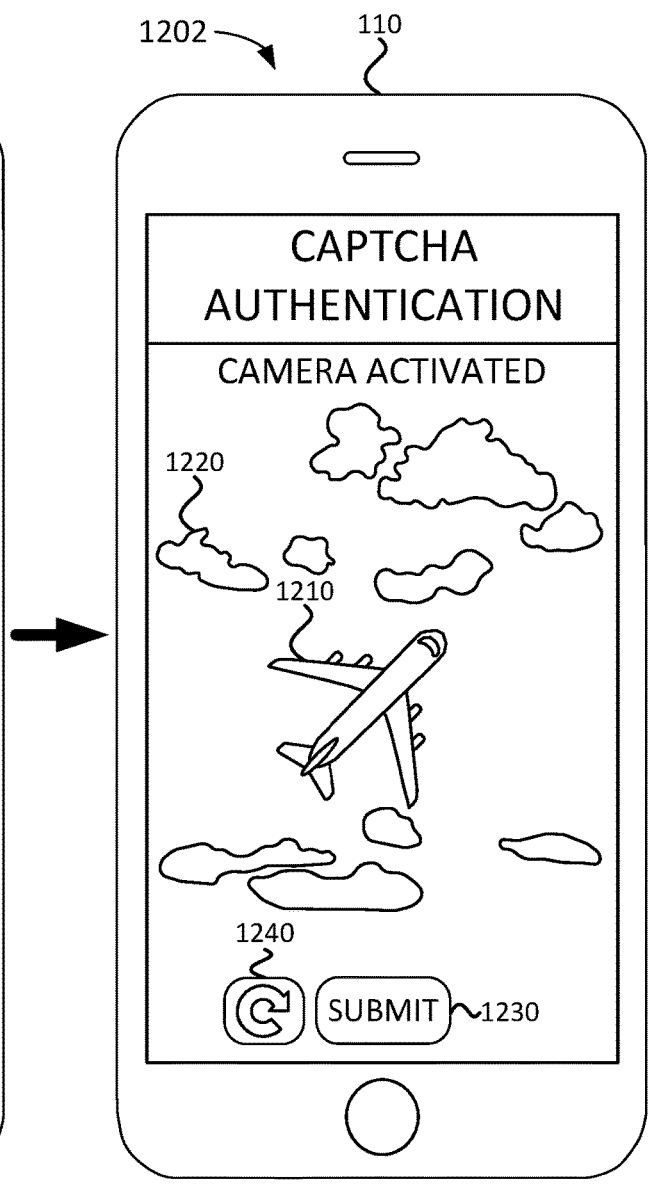

FIGS. 12A-12B are diagrams of a fourth set of exemplary user interfaces according to an implementation described herein. FIGS. 12A-12B illustrate a CAPTCHA challenge in which a first model, associated with an object in the presentation image, represents an object, and in which a second model, with which the first model is to be aligned by the user, represents an environment associated with the object.

As shown in FIG. 12A, user interface 1201 may include a presentation image 1210, a submit button 1230, and a reload button 1240. In the example of user interface 1201, presentation image 1210 includes an image of an airplane. Furthermore, back camera 260 of UE device 110 may be activated to display the user's environment. In order to complete the CAPTCHA challenge, the user is tasked with aligning the image of the airplane with an image of the sky. The user may align an image of the sky with clouds 1220 with the airplane in presentation image 1210, as shown in user interface 1202 in FIG. 12B, and then press submit button 1230.

As yet another example, the user may be presented with an image of a glove and be tasked with aligning the glove with the user's hand. As yet another example, the user may be presented with an image of eyeglasses and be tasked with aligning the eyeglasses with the user's eyes. As yet another example, the user may be presented with an image of a hat and tasked with aligning the hat with the user's head. As yet another example, the user may be presented with an image of a footprint and tasked with aligning the footprint with the user's foot. As yet another example, the user may be presented with an image of a car and tasked with aligning the car with the user's car keys or a road or street. As yet another example, the user may be presented with an image of a bird and tasked with aligning the image of the bird with a tree or with a powerline. Thus, some presentation images may be associated with multiple possible responses that are accepted by CAPTCHA authentication system 130. CAPTCHA authentication using the pairing of objects, as described herein, may therefore eliminate the need to use a keyboard or a keypad when submitting a CAPTCHA authentication response.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 7 and 8, the order of the blocks may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   providing, by a computer device, a presentation image to a user device, wherein the presentation image is associated with a first model and wherein the presentation image is movable on a display of the user device by a user;
   receiving, by the computer device, an image captured by a camera of the user device and a recorded alignment of the presentation image on the display of the user device;
   generating, by the computer device, a second model based on the received image captured by the camera of the user device;
   determining, by the computer device, that an alignment of the first model with the second model, based on the recorded alignment of the presentation image on the display of the user device, satisfies an alignment requirement; and
   generating, by the computer device, an authentication determination verifying that the user of the user device is human, based on determining that the alignment of the first model with the second model satisfies the alignment requirement.

2. The method of claim 1, wherein determining that the alignment of the first model with the second model satisfies the alignment criterion includes:
   determining that the alignment of the first model with the second model is within a particular range; and
   generating the authentication determination that the user of the user device is human, in response to determining that the alignment of the first model with the second model is within the particular range.

3. The method of claim 1, wherein generating the authentication determination includes:
   sending the authentication determination to an application running on the user device.

4. The method of claim 1, wherein the image captured by the camera of the user device includes depth information, and wherein generating the second model based on the received image captured by the camera of the user device includes:
   generating a three-dimensional (3D) model using the depth information.

5. The method of claim 4, wherein the first model includes a 3D model associated with the presentation image.

6. The method of claim 1, wherein determining that the alignment of the first model with the second model satisfies the alignment criterion includes:
   performing object recognition on the generated second model; and
   determining whether the image captured by the camera of the user device includes a particular object based on the performed object recognition.

7. The method of claim 1, wherein determining that the alignment of the first model with the second model satisfies the alignment criterion includes:
   selecting a first set of points from the first model;
   selecting a second set of points from the second model; and
   determining whether particular ones of the first set of points are within a particular distance from particular ones of the second set of points.

8. The method of claim 1, wherein the first model represents an object wearable by the user, and wherein the second model represents a body part used to wear the object.

9. The method of claim 1, wherein the first model represents a first object, and wherein the second model represents a second object couplable to the first object.

10. The method of claim 1, wherein the first model represents an object, and wherein the second model represents an environment associated with the object.

11. The method of claim 1, wherein the authentication determination corresponds to a completely automated public Turing test to tell computers and humans apart (CAPTCHA) authentication.

12. A computer device comprising:
    a memory storing instructions; and
    a processor configured to execute the instructions to:
       provide a presentation image to a user device, wherein the presentation image is associated with a first model and wherein the presentation image is movable on a display of the user device by a user;
       receive an image captured by a camera of the user device and a recorded alignment of the presentation image on a display of the user device;
       generate a second model based on the received image captured by the camera of the user device;
       determine that an alignment of the first model with the second model, based on the recorded alignment of the presentation image on the display of the user device, satisfies an alignment requirement; and
       generate an authentication determination verifying that the user of the user device is human, based on determining that the alignment of the first model with the second model satisfies the alignment requirement.

13. The computer device of claim 12, wherein, when determining that an alignment of the first model with the second model satisfies the alignment requirement, the processor is further configured to:
    determine that the alignment of the first model with the second model is within a particular range; and
    generate the authentication determination that the user of the user device is human, in response to determining that the alignment of the first model with the second model is within the particular range.

14. The computer device of claim 12, wherein the image captured by the camera of the user device includes depth information, and wherein, when generating the second model based on the received image captured by the camera of the user device, the processor is further configured to:
    generate a three-dimensional (3D) model using the depth information.

15. The computer device of claim 12, wherein, when determining that an alignment of the first model with the second model satisfies the alignment requirement, the processor is further configured to:

perform object recognition on the generated second model; and determine whether the image captured by the camera of the user device includes a particular object based on the performed object recognition.

16. The computer device of claim 12, wherein, when determining that an alignment of the first model with the second model satisfies the alignment requirement, the processor is further configured to:

select a first set of points from the first model;

select a second set of points from the second model; and determine whether particular ones of the first set of points are within a particular distance from particular ones of the second set of points.

17. The computer device of claim 12, wherein the first model represents an object wearable by the user, and wherein the second model represents a body part used to wear the object.

18. The computer device of claim 12, wherein the first model represents a first object, and wherein the second model represents a second object couplable to the first object.

19. The computer device of claim 12, wherein the first model represents an object, and wherein the second model represents an environment associated with the object.

20. A non-transitory computer-readable memory device storing instructions executable b a processor, the non-transitory computer-readable memory device comprising:

one or more instructions to provide a presentation image to a user device, wherein the presentation image is associated with a first model and wherein the presentation image is movable on a display of the user device by a user;

one or more instructions to receive an image captured by a camera of the user device and a recorded alignment of the presentation image on a display of the user device;

one or more instructions to generate a second model based on the received image captured by the camera of the user device;

one or more instructions to determine that an alignment of the first model with the second model, based on the recorded alignment of the presentation image on the display of the user device, satisfies an alignment requirement; and one or more instructions to generate an authentication determination verifying that the user of the user device is human, based on determining that the alignment of the first model with the second model satisfies the alignment requirement.

* * * * *